United States Patent [19]

Tranin

[11] Patent Number: 5,549,043
[45] Date of Patent: Aug. 27, 1996

[54] NUMERICALLY CONTROLLED PRINTING MACHINE WITH RECTILINEAR PRINT LINE

[75] Inventor: Frédéric Tranin, Ozoir La Ferrier, France

[73] Assignee: Societe d'Exploitation des Machines Dubuit, Noisy le Grand, France

[21] Appl. No.: 365,223

[22] Filed: Dec. 28, 1994

[30] Foreign Application Priority Data

Jan. 14, 1994 [FR] France ................................. 94 00361

[51] Int. Cl.⁶ .................................................. B41F 15/04
[52] U.S. Cl. ........................................... 101/126; 101/115
[58] Field of Search ..................................... 101/123, 124, 101/126, 129, 115

[56] References Cited

U.S. PATENT DOCUMENTS 4,583,458  4/1986  Beachum .............................. 101/126
4,981,074  1/1991  Machita et al. .................... 101/126 X
5,165,340  11/1992  Karlyn et al. ........................ 101/126
5,361,694  11/1994  Dubuit .................................. 101/115

FOREIGN PATENT DOCUMENTS 2689059  10/1993  France .

Primary Examiner—Christopher A. Bennett
Attorney, Agent, or Firm—Young & Thompson

[57] ABSTRACT

A printing machine includes a rectilinear print line along which an object station adapted to receive an object to be printed moves under the control of a numerical controller. A print head overlies the print line at one printing station at least. Two conjointly mobile object stations are staggered along the print line. The numerical controller delivers stopping instructions corresponding to distances from which the distance between the object stations is deducted in alternate operating cycles.

8 Claims, 2 Drawing Sheets

NUMERICALLY CONTROLLED PRINTING MACHINE WITH RECTILINEAR PRINT LINE

BACKGROUND OF THE INVENTION

1. Field of the Invention

The present invention is generally concerned with printing machines of the kind in which an object station adapted to receive an object to be printed moves along a rectilinear print line with a print head overlying this print line at one printing station at least.

It is more particularly, but not exclusively, concerned with the situation in which the print head is a silkscreen print head carrying a silk screen and a squeegee.

2. Description of the Prior Art

A printing machine of this kind is described in published French patent application No 2 689 059 filed 26 Mar. 1992 under application number 92 03636.

The above French patent application discloses only one object station and in practise in the corresponding printing machine, its displacement is under the control of a numerical controller issuing an instruction to stop at the printing station at the correct time, this instruction corresponding to the distance between the printing station and a loading station in which objects to be printed are loaded individually.

In each operating cycle the object printed during the preceding cycle has to be removed.

To the detriment of productivity, this halts the print line for a relatively long time, i.e. the time taken to substitute one object for another.

A general object of the present invention is a system which has the advantage of reducing this stopping time.

SUMMARY OF THE INVENTION

The present invention consists in a printing machine including a rectilinear print line along which an object station adapted to receive an object to be printed moves under the control of a numerical controller, a print head overlying said print line at one printing station at least, and two conjointly mobile object stations staggered along said print line, said numerical controller delivering stopping instructions corresponding to distances from which the distance between said object stations is deducted in alternate operating cycles.

Accordingly, an object to be printed can be loaded onto the two object stations alternately in alternate operating cycles, and at the same time as the previously printed object is removed, without this disturbing the operation of the system in any way.

The advantage of this is that the stopping time of the print line is reduced commensurately.

For example for loading an object to be printed and simultaneously removing the object previously printed the printing machine of the invention includes, at the loading station, a loader equipped with two pick-up units carried by a common support and separated by the distance between the object stations, an object to be printed being picked up and a printed object being put down at specific locations, which are the same on each occasion, this support rotating about and reciprocating along an axis perpendicular to the print line.

The advantage of this is that an object can be loaded and removed automatically, with no particular complication.

The features and advantages of the invention will emerge from the following description given by way of example with reference to the appended diagrammatic drawings.

DETAILED DESCRIPTION OF THE PREFERRED EMBODIMENT

Figure 2:
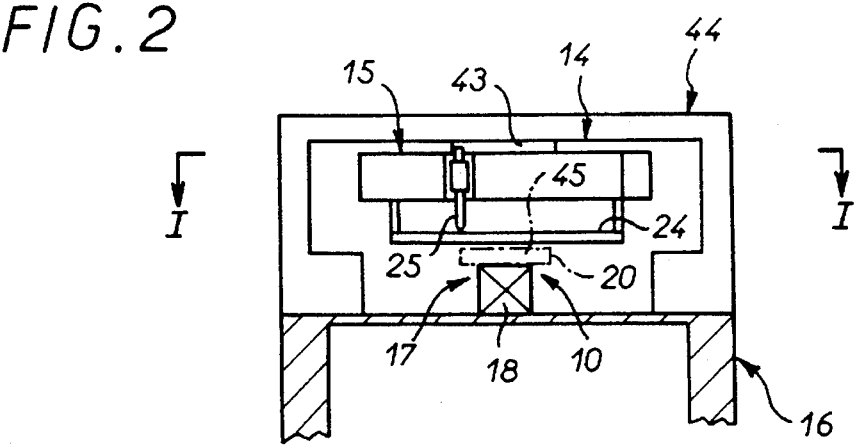
FIG. 2 is a view of the machine in transverse section on the line II—II in FIG. 1.

As shown in the figures, the printing machine of the invention includes, in a manner that is known in itself, an object station 12A adapted to receive an object 13 to be printed which moves along a rectilinear print line 10 under the control of a numerical controller (FIG. 1) with a print head 15 overlying the print line 10 at one printing station 14 at least.

The objects 13 to be printed are compact discs, for example.

In the embodiment shown the print line 10 uses a frame 16 carrying an integral rail guide device 17 of the type sold under the tradename "STAR" by the company AIME VISA BILLES S.A. or "THK".

As an integral rail guide device 17 of this kind is well known in itself and is not relevant to the present invention it is not described in detail here.

Figure 1:
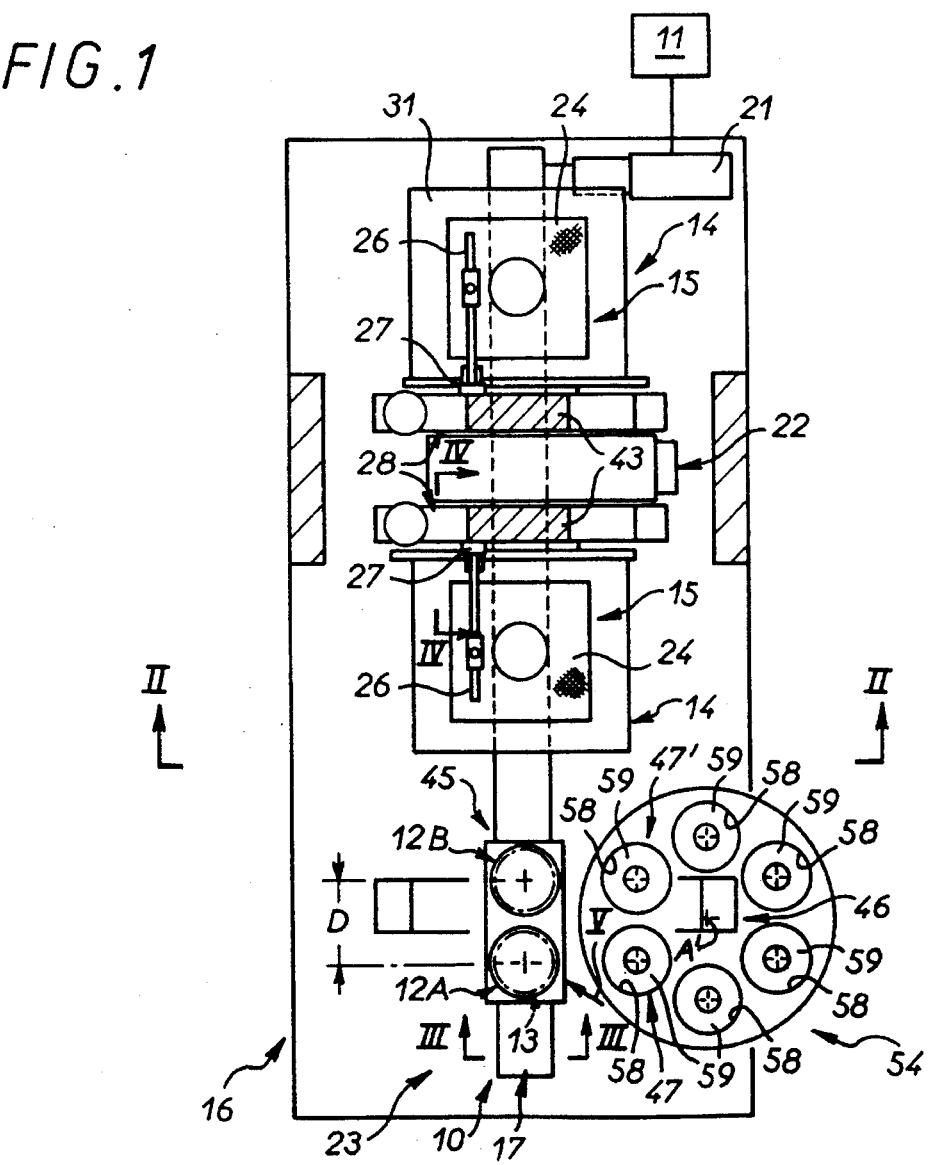
FIG. 1 is a locally cutaway plan view of the printing machine of the invention in section on the line I—I in FIG. 2.
Figure 3:
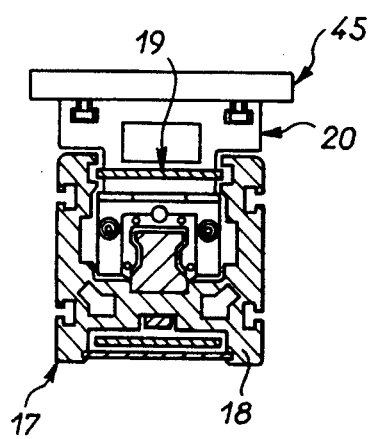
FIG. 3 is a view of part of the machine to a larger scale and in transverse section on the line III—III in FIG. 1.
Figure 4:
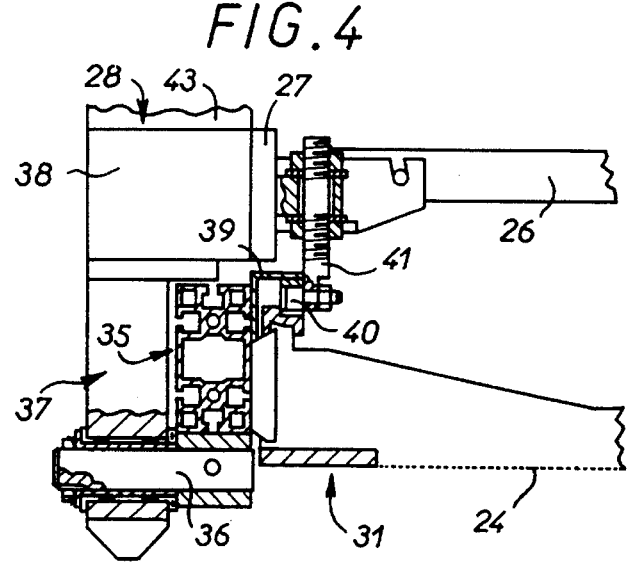
FIG. 4 is another view of part of the machine in transverse section on the line IV—IV in FIG. 1.

Suffice to say that, referring to FIG. 3, it includes a rail 18 carrying an endless belt 19 to the upper run of which is keyed a carriage 20. Referring to FIG. 1, the belt 19 is driven by a motor 21 controlled by the numerical controller 11.

The motor 21 is preferably a brushless motor and reciprocates the carriage 20 along the rail 18 under the control of the numerical controller 11, as explained in more detail below.

In the embodiment shown the printing machine of the invention includes at least two printing stations 14 staggered along the print line 10 with a drying station 22 between them.

At one end of the integral rail guide device 17, for example its end opposite that at which the motor 21 is located, is a loading station 23 described in more detail below.

During an operating cycle the numerical controller 11 issues stopping instructions to the motor 21 corresponding to the distances between the loading station 23, the printing stations 14 and the drying station 22.

In practise, during the "out" stroke of an operating cycle, the motor 21 is stopped at the first printing station 14 for the application of a first color (or more generally a first print impression) to the object 13 to be printed, is stopped at or moves continuously past the drying station 22, and stops at the second printing station 14 for the application of a second color (or more generally a second print impression) to the object 13 to be printed.

During the "return" stroke of a working cycle the motor 21 is stopped at the drying station 22 or moves continuously past it.

The above arrangements are well known in themselves and familiar to the person skilled in the art, and for this reason they are not described in detail.

In a manner that is also known in itself the print head 15 at the printing stations 14 is a silkscreen print head, for example, as shown here.

The silkscreen print head is shown schematically in the figures.

The construction of a silkscreen print head is well known in itself and not relevant to the present invention, and for this reason is not described in detail here.

Suffice to say that it includes a screen 24 centered on the axis of the print line 10 and fixed in position and a squeegee 25 above the screen 24 carried by a squeegee arm 26 and mobile relative to the screen 24 in a direction transverse to the print line 10.

In the embodiment shown the squeegee arm 26 is attached to the carriage 27 of an integral rail guide device 28 of the type previously described.

The screen 24 is carried by a screen support 31.

It can be adjustable in position on the latter, for example.

Figure 5:
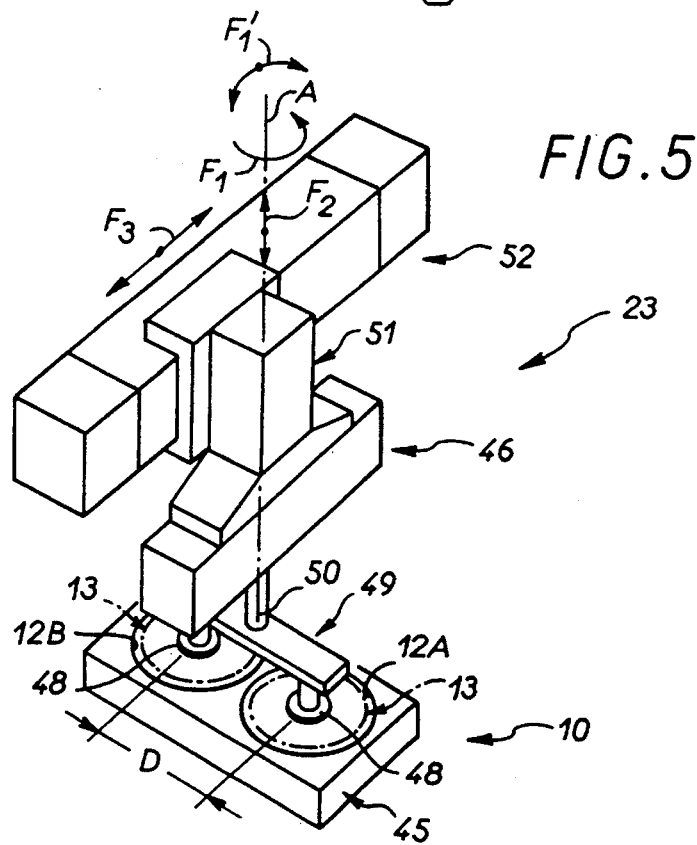
FIG. 5 is a perspective view of part of the machine as seen in the direction of the arrow V in FIG. 1.

As seen more clearly in FIG. 5, the screen support 31 is attached to a beam 35 pivoting on a shaft 36 carried by an upright 37 fastened to the rail 38 of the integral rail guide device 28. An angle iron 39 carried by the beam 35 is guided by a roller 40 carried by an upright 41 fastened to the carriage 27 carrying the squeegee arm 26.

In the embodiment shown at each printing station 14 the rail 38 of the integral rail guide device 28 is coupled by a suspension member 43 to a gantry 44 which is carried by the frame 16 and straddles the print line 10.

In accordance with the invention, two conjointly mobile object stations 12A, 12B are staggered along the print line 10 and the associated numerical controller 11 issues stopping instructions corresponding to distances which are subtracted in alternate operating cycles from the distance D between the two object stations 12A, 12B.

In the embodiment shown the two object stations 12A, 12B are carried by a common object support 45 attached to the carriage 20 of the integral rail guide device 17 of the print line 10.

As shown here, for example, the object station 12A is that which, at the start of an operating cycle, is farthest from the printing stations 14, while the object station 12B is that nearest them.

In the embodiment shown, the printing machine of the invention includes, at the loading station 23, a loader 46 equipped with two pick-up units 48 separated by a distance equal to the distance D between the object stations 12A, 12B. They are carried by a common support 49 and an object 13 to be printed is picked up and a printed object 13 is put down at specific locations 47, 47' which are the same on each occasion. The support 49 rotates about and reciprocates along an axis A perpendicular to the print line 10.

The axis A perpendicular to the print line 10 is perpendicular to the plane of the objects 13 to be printed, as shown, and is therefore perpendicular to the object support 45 and to the screen 24 of the print heads 15.

The support 49 is a crossmember attached to the end of the piston rod 50 of a ram (not shown) in a T-shape arrangement. The ram is accommodated in a body 51 and is rotated on itself about the axis of the piston rod 50 by another ram, also not shown.

These arrangements are familiar to the person skilled in the art and for this reason are not described in detail here.

The support 49 can be rotated about the axis A continuously, as indicated by the arrow F1 in FIG. 5, or alternately, in 180° steps, as shown by the double-headed arrow F'1 in FIG. 5.

Its reciprocation along the axis A is indicated by the double-headed arrow F2 in FIG. 5.

In the embodiment shown the support 49 is itself carried, through the intermediary of the body 51, by a transfer device 52 which, as indicated by the double-headed arrow F3 in FIG. 5, alternately places it over the print line 10 (this is the position shown in FIG. 5) and away from the print line 10, over the picking up and putting down positions 47, 47'.

In practise the transfer device 52 operates in a linear manner and extends generally transversally to the print line 10, between the latter and a conveyor 54.

The transfer device 52 is an integral rail guide device of the type previously described, for example.

The conveyor 54 can be a drum rotating about an axis A' parallel to the axis A (FIG. 1).

As this conveyor is not relevant to the present invention it is not described here.

Suffice to say that it includes, equi-angularly spaced around its circumference, a plurality of object stations 58 each adapted to receive a support 59 onto which objects 13 to be printed and objects 13 already printed can be stacked. At any time two objects 13 are present at the picking up position 47 and the putting down position 47', respectively.

In the embodiment shown, the picking up position 47 and the putting down position 47' are, seen in plan, at the corners of a rectangle at the other two corners of which are the object stations 12A, 12B.

The pick-up units 48 of the loader 46 are suction devices, for example.

For example, each includes a plurality of suction nozzles disposed in a circular arrangement about a common axis and selectively connectable to a suction pump (not shown) or vented to atmosphere, under the control of a valve, also not shown. These provisions are well known in themselves and are not described here.

In accordance with the invention, one of the pick-up units 48 is vented when the other is connected to the suction pump, and vice versa.

At the start of an operating cycle the pick-up units 48 are aligned with the print line 10.

One carries an object 13 to be printed and the other is empty.

The support 49 is commanded to lower the pick-up units 48.

That which is carrying an object 13 puts it down at one of the object stations 12A, 12B while the other picks up from the other object station 12A, 12B the object 13 printed during the previous operating cycle.

The support 49 is then raised along the axis A and then moved in translation along the transfer device 52. Where applicable, during this movement in translation it is rotated on itself 180° about the axis A, as explained below.

When the support 49 reaches the conveyor 54 it is lowered and releases the printed object 13 it is carrying at the putting down position 47' and picks up a new object 13 to be printed at the picking up position 47.

It is then raised again and movement in translation and where applicable rotation by 180° returns it to a position over the print line 10.

During this time the object 13 previously put down is printed, under the control of the motor 21.

A new operating cycle can then begin.

The numerical controller 11 delivers appropriate stopping instructions to the motor 21 according to whether the object 13 to be printed has been put down at the object station 12A or at the object station 12B.

Figure 6:
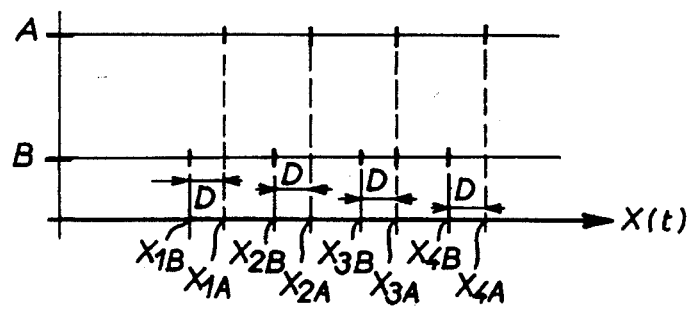
FIG. 6 is a diagram showing how the printing machine of the invention works.

As shown in the FIG. 6 diagram, in which the stopping instructions are represented by marks transverse to a line A for an object 13 put down at the object station 12A and to a line B for an object 13 put down at the object station 12B, the lines A and B being parallel to a time line X(t), the stopping instructions correspond to the distances X1..., X2 ..., X3..., X4... between the loading station 23 and the first printing station 14, the drying station 22, the second printing station 14 and, on the return stroke, the drying station 22, respectively.

If the object 13 to be printed has been put down at the object station 12B, the stopping distance X1B, X2B, X3B and X4B are offset by the distance D relative to the stopping distances X1A, X2A, X3A, X4A which apply if the object 13 is put down at the object station 12A.

In practise, this occurs on alternate cycles.

To define the origin for each cycle a resolver (not shown) is associated with the motor 21, for example.

When a sensor at the loading station 23 outputs a signal, for example when the object support 45 moves past it, the first pulse delivered by the resolver defines the origin.

The precision of the stopping positions defined by the motor 21 is therefore dependent on the motor and not on the sensor.

However, in each operating cycle an object 13 to be printed is picked up from the same place, in this instance the picking up position 47, and this is the same every time.

Likewise, a printed object 13 is always put down at the same position, in this instance the putting down position 47', which is the same each time.

Therefore, depending on whether the object 13 to be printed is put down at the object station 12A, which faces the picking up position 47, or at the object station 12B, which is diagonally opposite the picking up position 47, the movement in translation of the support 49 is not accompanied by rotation or accompanied by rotation, respectively.

In other words, the rotation is effected only in alternate operating cycles.

Being of simple implementation, it advantageously provides permanent picking up and putting down positions 47, 47', which is also advantageous in that it promotes a simple implementation of the system.

Of course, the present invention is not limited to the embodiment described and shown but encompasses any variant execution thereof.

There is claimed:

1. Printing machine comprising a rectilinear print line including carriage means mounted for reciprocating movement along said print line, at least one printing station disposed along said rectilinear print line, a print head overlying said print line at the at least one printing station, two object stations adapted to be selectively loaded/unloaded with objects to be printed, said object stations being spaced a distance from each other along the rectilinear print line, and numerical control means for selectively controlling the displacement of the carriage means for a first distance for a first of said object stations and a second distance for a second one of said object stations, the second distance being equal to the first distance less the distance between the object stations along the rectilinear print line.

2. Printing machine according to claim 1, further comprising a common object support carrying said two object stations.

3. Printing machine according to claim 1, wherein at least two said printing stations are disposed at spaced locations along said rectilinear print line.

4. Printing machine according to claim 3, further comprising a drying station disposed along said rectilinear print line between said at least two printing stations.

5. Printing machine comprising a rectilinear print line including carriage means mounted for reciprocating movement along said print line, at least one printing station disposed along said rectilinear print line, a print head overlying said print line at the at least one printing station, two object stations adapted to be selectively loaded/unloaded with objects to be printed, said object stations being spaced a distance from each other along the rectilinear print line, a common object support carrying said two object stations, numerical control means for selectively controlling the displacement of the carriage means for a first distance for a first of said object stations and a second distance for a second one of said object stations, the second distance being equal to the first distance less the distance between the object stations along the rectilinear print line, loading means including two pick-up units carried on another common pick-up support, said pick-up units being spaced from each other a distance equal to the distance between said object stations, said loading means having respective pickup and delivery positions, said pick-up units being mounted for selective movement between the object stations and pick-up and delivery positions, said common pick-up supporting being mounted for rotation and for reciprocating movement in a direction transverse to that of said rectilinear print line.

6. Printing machine according to claim 5, wherein said two pick-up units comprise separate and alternately operable suction means, one of said suction means being vented to atmosphere while the other of said suction means is connected to a suction pump.

7. Printing machine according to claim 6, further comprising a transfer device carrying said common pick-up support for alternate displacement between a position over said print line and a position spaced away from said print line.

8. Printing machine according to claim 7, wherein said transfer device is mounted for linear displacement and extending transversely to said print line.

* * * * *